US012759310B2

(12) United States Patent
Ogawa et al.

(10) Patent No.: US 12,759,310 B2
(45) Date of Patent: Oct. 13, 2026

(54) INKJET PRINTING APPARATUS

(71) Applicant: SCREEN Holdings Co., Ltd., Kyoto (JP)

(72) Inventors: Akihiro Ogawa, Kyoto (JP); Takuya Ito, Kyoto (JP); Mitsuru Tanemoto, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 100 days.

(21) Appl. No.: 19/023,666

(22) Filed: Jan. 16, 2025

(65) Prior Publication Data

US 2025/0296348 A1 Sep. 25, 2025

(30) Foreign Application Priority Data

Mar. 21, 2024 (JP) ................................ 2024-044388

(51) Int. Cl.
*B41J 2/175* (2006.01)
*B41J 2/18* (2006.01)
*B41J 29/00* (2006.01)

(52) U.S. Cl.
CPC ................ *B41J 2/18* (2013.01); *B41J 2/175* (2013.01); *B41J 29/00* (2013.01)

(58) Field of Classification Search
CPC ..... B41J 2/175; B41J 2/18; B41J 2/195; B41J 2002/022; B41J 29/00; B41J 29/393
See application file for complete search history.

(56) References Cited

U.S. PATENT DOCUMENTS

2010/0085396 A1* 4/2010 Yokota ................ B41J 2/14233 347/17
2010/0245495 A1* 9/2010 Katada .................... B41J 2/515 347/85
2013/0050362 A1* 2/2013 Koike ....................... B41J 2/18 347/92
2016/0121635 A1* 5/2016 Takata .................... B41J 2/175 347/19
2024/0198692 A1* 6/2024 Kyoso ....................... B41J 2/01
2025/0196520 A1* 6/2025 Arima ....................... B41J 2/08

FOREIGN PATENT DOCUMENTS

JP 2020-082392 A 6/2020

* cited by examiner

*Primary Examiner* — Anh T Vo
(74) *Attorney, Agent, or Firm* — Rimon P.C.

(57) ABSTRACT

A control unit determines whether a first difference value obtained by subtraction of a result of detection of a temperature of ink in a supply-side manifold from a first target temperature of ink in the supply-side manifold applies to a first phase in which the first difference value is equal to or larger than a first reference value, or a third phase in which the first difference value is smaller than a second reference value smaller than the first reference value. Then, when it is determined that the first difference value applies to the first phase, the control unit controls driving of a second heater in accordance with a value obtained by multiplication of a second difference value obtained by subtraction of a result of detection of a temperature of ink in a feedback pipe from a second target temperature of ink in the feedback pipe, by a first coefficient.

11 Claims, 5 Drawing Sheets

INKJET PRINTING APPARATUS

RELATED APPLICATIONS

This application claims the benefit of Japanese application No. 2024-044388, filed on 21 Mar. 2024, the disclosure of which is incorporated by reference herein.

BACKGROUND OF THE INVENTION

Field of the Invention

The present invention relates to an inkjet printing apparatus that discharges ink onto a printing medium such as paper to perform printing.

Description of the Background Art

Conventionally, an inkjet printing apparatus includes an ink circulation path through which ink is supplied to a discharge head configured to discharge ink onto a printing medium, and ink being left undischarged in the discharge head is collected and again supplied to the discharge head, in some cases. An inkjet printing apparatus including such an ink circulation path as mentioned above is described in, for example, Japanese Patent Application Laid-Open No. 2020-082392.

A printing apparatus (1) of Japanese Patent Application Laid-Open No. 2020-082392 includes an ink circulation unit (3), an ink-temperature adjustment unit (4), and a control unit (6) (paragraph [0016]). The ink circulation unit (3) supplies ink to an inkjet head (2) while circulating ink (paragraph [0019]). Ink flows from an upstream tank (21) to a distributor (25) via a pipe (27) and is distributed to each of a plurality of head modules (11) of the inkjet head (2) (paragraph [0026] and FIG. 2).

Meanwhile, the ink-temperature adjustment unit (4) adjusts a temperature of ink flowing through the ink circulation unit (3) (paragraph [0029]). An ink-temperature detection unit (33) is placed at some midpoint in the pipe (27) and detects a temperature of ink flowing through the pipe (27) (paragraph [0032]). When determining that it is necessary to adjust a temperature of ink on the basis of an ink temperature detected by the ink-temperature detection unit (33), an ink-temperature controller (53) of the control unit (6) controls the ink circulation unit (3) and the ink-temperature adjustment unit (4) such that a temperature of ink is adjusted toward an appropriate temperature range while circulating ink (paragraphs [0071] and [0073]).

However, in Japanese Patent Application Laid-Open No. 2020-082392, after passing through the pipe (27) in which the ink-temperature detection unit (33) is placed, ink is distributed to the plurality of head modules (11) of the inkjet head (2) via the distributor (25). Hence, even though the ink-temperature adjustment unit (4) is controlled and a temperature of ink is adjusted in accordance with a result of detection of ink temperature by the ink-temperature detection unit (33), the temperature varies before arrival at each head module (11), so that the ink temperature might not be adjusted to an appropriate temperature. On the other hand, to too exactly adjust a temperature of ink directed to each head module (11) at the time of start-up or the like of the printing apparatus (1) would possibly result in taking too much time for start-up or the like.

SUMMARY OF THE INVENTION

It is an object of the present invention to provide a technology that enables reduction of time for start-up from low ink temperatures and exact adjustment of a temperature of ink directed to a head.

To solve the above-described problem, the first invention of the present application is directed to an inkjet printing apparatus that discharges ink onto a printing medium to perform printing, and includes an ink circulation path, a heater, a feedback-side temperature sensor, a supply-side temperature sensor, and a control unit. The circulation path includes a plurality of heads configured to discharge ink, a supply tank in which ink supplied to the plurality of heads is stored, a plurality of supply-side individual pipes connected to the plurality of heads, respectively, a supply-side manifold that has an upstream end communicating with the supply tank and is forked into the plurality of supply-side individual pipes, a collecting tank in which ink collected from the plurality of heads is stored, and a feedback pipe connecting the collecting tank and the supply tank. The heater is interposed in the feedback pipe and is configured to heat ink flowing from the collecting tank to the supply tank. The feedback-side temperature sensor is interposed between the heater and the supply tank in the feedback pipe and is configured to detect a temperature of ink in the feedback pipe. The supply-side temperature sensor is interposed in the supply-side manifold and is configured to detect a temperature of ink in the supply-side manifold. The control unit is electrically connected to each of the heater, the feedback-side temperature sensor, and the supply-side temperature sensor. The control unit determines whether a first difference value obtained by subtracting a result of detection of the temperature of the ink in the supply-side manifold by the supply-side temperature sensor, from a first target temperature of the ink in the supply-side manifold, applies to a first phase in which the first difference value is equal to or larger than a first reference value, or a third phase in which the first difference value is smaller than a second reference value smaller than the first reference value. Then, when it is determined that the first difference value applies to the first phase, the control unit controls driving of the heater in accordance with a value obtained by multiplication of a second difference value by a first coefficient, the second difference value being obtained by subtracting a result of detection of the temperature of the ink in the feedback pipe by the feedback-side temperature sensor from a second target temperature of the ink in the feedback pipe. Meanwhile, when it is determined that the first difference value applies to the third phase, the control unit controls driving of the heater in accordance with the value obtained by multiplication of the second difference value by the first coefficient and a value obtained by multiplication of the first difference value by a third coefficient.

The second invention of the present application is directed to the inkjet printing apparatus according to the first invention, further including an in-housing temperature sensor configured to detect a temperature of a space external to the circulation path. The control unit determines whether the first difference value applies to a second phase in which the first difference value is smaller than the first reference value and is equal to or larger than the second reference value. Then, when it is determined that the first difference value applies to the second phase, the control unit controls driving of the heater in accordance with the value obtained by multiplication of the second difference value by the first coefficient and a heat-dissipation correction value obtained by multiplication of a result of detection of the temperature of the space external to the circulation path, being detected by the in-housing temperature sensor, by a second coefficient.

The third invention of the present application is directed to the inkjet printing apparatus according to the first invention, wherein the control unit determines whether the first difference value applies to a second phase in which the first difference value is smaller than the first reference value and is equal to or larger than the second reference value. Then, when it is determined that the first difference value applies to the second phase, the control unit controls driving of the heater in accordance with the value obtained by multiplication of the second difference value by the first coefficient, and a heat-dissipation correction value obtained by multiplication of a third difference value by a fourth coefficient, the third difference value being obtained by subtracting the result of detection of the temperature of the ink in the supply-side manifold, being detected by the supply-side temperature sensor, from the result of detection of the temperature of the ink in the feedback pipe, being detected by the feedback-side temperature sensor.

The fourth invention of the present application is directed to the inkjet printing apparatus according to the second or third invention, wherein, when it is determined that the first difference value applies to the third phase, the control unit controls driving of the heater in accordance with the value obtained by multiplication of the second difference value by the first coefficient, the heat-dissipation correction value, and the value obtained by multiplication of the first difference value by the third coefficient.

The fifth invention of the present application is directed to the inkjet printing apparatus according to the first invention, wherein the control unit determines whether the first difference value calculated at regular intervals applies to the first phase in which the first difference value is equal to or larger than the first reference value, or the third phase in which the first difference value is smaller than the second reference value smaller than the first reference value, the first difference value being obtained by subtracting the result of detection of the temperature of the ink in the supply-side manifold, being detected at the regular intervals by the supply-side temperature sensor, from the first target temperature of the ink in the supply-side manifold. Then, when it is determined that the first difference value applies to the third phase, the control unit controls driving of the heater in accordance with the value obtained by multiplication of the second difference value by the first coefficient, and a value obtained by addition in which values each obtained by multiplication of the first difference value by the third coefficient are cumulatively added up at the regular intervals.

The sixth invention of the present application is directed to the inkjet printing apparatus according to any of the first to fifth inventions, further including a plurality of the supply-side temperature sensors that are interposed in the supply-side manifold and are configured to detect the temperature of the ink in the supply-side manifold. Then, the control unit sets a value obtained by subtracting an average value of respective results of detection of the temperature of the ink in the supply-side manifold by the plurality of supply-side temperature sensors from the first target temperature of the ink in the supply-side manifold, as the first difference value.

The seventh invention of the present application is directed to the inkjet printing apparatus according to any of the second to fourth inventions, further including a flow-rate measurement unit configured to measure a flow rate of ink flowing through the circulation path. The control unit is further electrically connected to the flow-rate measurement unit. Then, when it is determined that the first difference value applies to the second phase, the control unit controls driving of the heater in accordance with a value obtained by correction in which the value obtained by multiplication of the second difference value by the first coefficient, and the heat-dissipation correction value, are corrected using a result of measurement of the flow rate of the ink by the flow-rate measurement unit.

The eighth invention of the present application is directed to the inkjet printing apparatus according to any of the first to seventh inventions, wherein the first coefficient is a positive value.

The ninth invention of the present application is directed to the inkjet printing apparatus according to the second invention, wherein the first coefficient is a positive value, and the second coefficient is a negative value.

The tenth invention of the present application is directed to the inkjet printing apparatus according to any of the first to ninth inventions, wherein the first coefficient is a positive value, and the third coefficient is a positive value.

The eleventh invention of the present application is directed to the inkjet printing apparatus according to the third invention, wherein the first coefficient is a positive value, and the fourth coefficient is a positive value.

According to the first to eleventh inventions of the present application, in the first phase, in which the temperature of the ink in the supply-side manifold is low, the heater is driven with high intensity, which enables reduction of time for start-up from low temperatures. Meanwhile, in the third phase, the temperature of the ink in the supply-side manifold is close to the target temperature (first target temperature). Thus, by more exactly driving the second heater while referring to the temperature of the ink in the supply-side manifold, it is possible to suppress overheating of the ink.

Especially, according to the second invention of the present application, in the second phase, also the temperature of the space external to the circulation path in the inkjet printing apparatus is referred to. Hence, heat dissipation of the ink can be taken into account, which enables more exact driving of the heater than in the first phase.

Especially, according to the third invention of the present application, in the second phase, heat dissipation of the ink from a position where the feedback-side temperature sensor is placed between the heater and the supply tank to a position where the supply-side temperature sensor is placed in the supply-side manifold can be taken into account, which enables more exact driving of the heater than in the first phase.

Especially, according to the fourth invention of the present application, in the third phase, the heat-dissipation correction value is referred to, in addition to the temperature of the ink in the supply-side manifold, which enables more exact driving of the heater.

Especially, according to the fifth invention of the present application, it is possible to prevent a value for driving the heater from being extremely large or small. This enables stable driving of the heater.

Especially, according to the sixth invention of the present application, even in a case in which the temperature of ink varies with position and is non-uniform in the supply-side manifold, the heater can be stably driven in the first phase and the third phase.

Especially, according to the seventh invention of the present application, in the second phase, also the flow rate of ink is referred to, which enables more exact driving of the heater.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
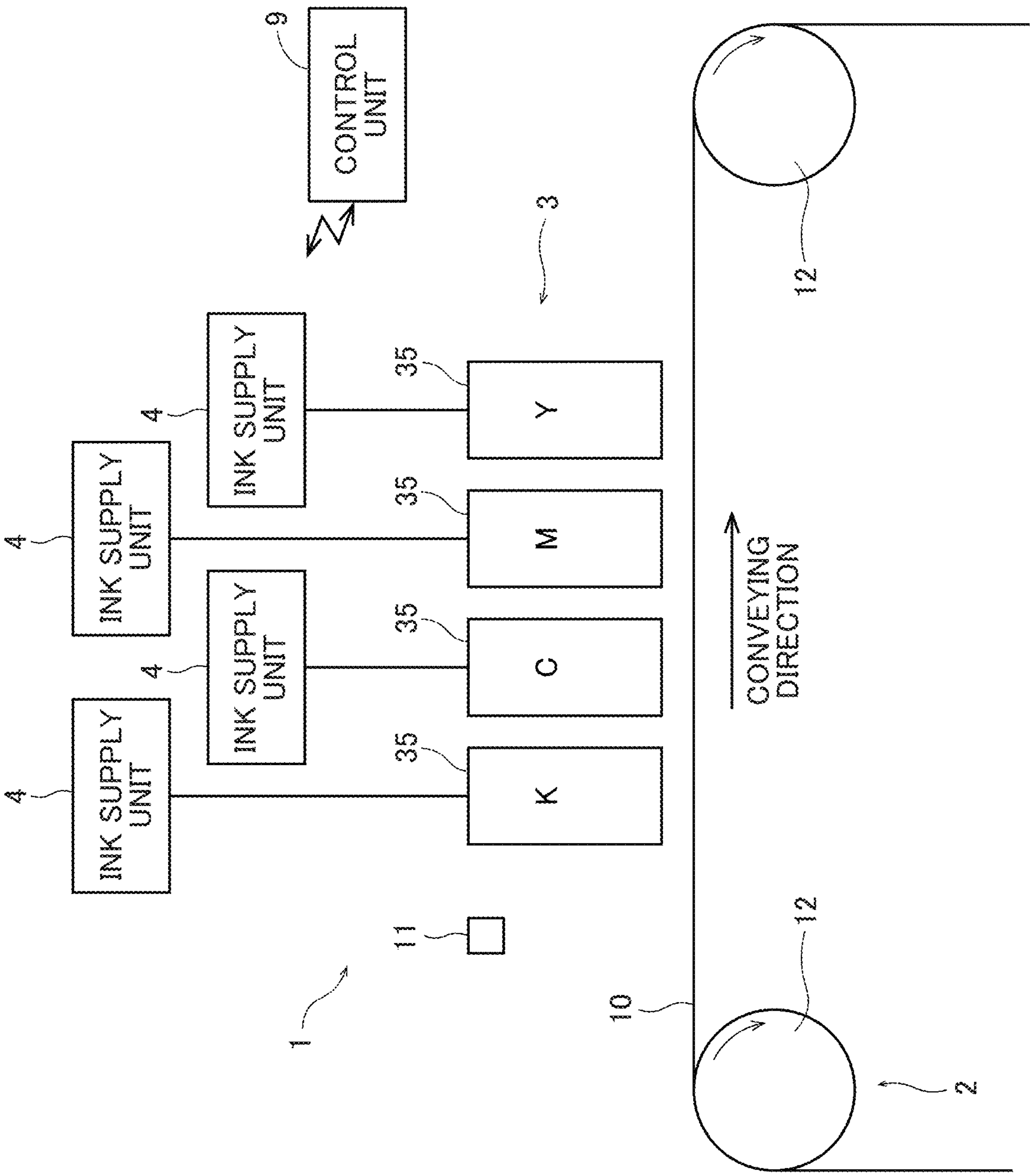
FIG. 1 is a view conceptually showing a configuration of an inkjet printing apparatus.

Hereinafter, preferred embodiments of the present invention will be described with reference to the drawings. Note that components described in these embodiments are mere examples and are not intended to limit the scope of the present invention to those only. In the drawings, for the purpose of easier understanding, the dimensions or the number of respective components are overstated or understated in some portions of illustration, as necessary.

1. First Preferred Embodiment

1-1. Configuration of Inkjet Printing Apparatus

FIG. 1 is a view conceptually showing a configuration of an inkjet printing apparatus 1 according to one preferred embodiment of the present invention. The inkjet printing apparatus 1 is an inkjet printing machine that discharges droplets of water-based ink onto continuous paper 10 in a shape of a long strip from a plurality of discharge heads 35 while conveying the continuous paper 10, to record characters or images on a surface of the continuous paper 10. Note that the continuous paper 10 in a shape of a long strip is just one example of a printing medium. The printing medium may be a cut sheet, a plastic film, cardboard, metal foil, a glass material, or the like. In other words, the inkjet printing apparatus 1 may be any apparatus that can discharge ink onto a printing medium to perform printing. As shown in FIG. 1, the inkjet printing apparatus 1 includes a conveyor unit 2, a printing unit 3, a control unit 9, and an in-housing temperature sensor 11.

The conveyor unit 2 is a mechanism configured to convey the continuous paper 10 along a predetermined conveying path in a conveying direction extending along a length direction of the continuous paper 10. The continuous paper 10 is stretched over a plurality of conveyor rollers 12. The continuous paper 10 is conveyed along a conveying path formed by the plurality of conveyor rollers 12. Each of the conveyor rollers 12 rotates about an axis extending in a direction perpendicular to the conveying direction, to thereby guide the continuous paper 10 to the downstream side in the conveying path. Further, the continuous paper 10 is under tension in the conveying direction. This reduces slack or wrinkles in the continuous paper 10 during conveying.

The printing unit 3 includes a plurality of discharge heads 35 and a plurality of ink supply units 4. In the present embodiment, the printing unit 3 includes four discharge heads 35 and four ink supply units 4. The four discharge heads 35 have substantially the same configuration with each other. Further, the four ink supply units 4 have substantially the same configuration with each other.

The four discharge heads 35 are arranged while being spaced from each other along the conveying direction. Each of the four discharge heads 35 discharges ink droplets onto a surface (upper surface) of the continuous paper 10 from nozzles 83 (refer to FIG. 2 described later). In the present embodiment, the four discharge heads 35 discharge ink of different colors, respectively, to thereby each record a monochromatic image on the surface (upper surface) of the continuous paper 10. In the present embodiment, for example, the four discharge heads 35 discharge cyan ink, magenta ink, yellow ink, and black ink, respectively. Then, the four monochromatic images are superimposed, so that a multicolor image is formed on the upper surface of the continuous paper 10.

Figure 2:
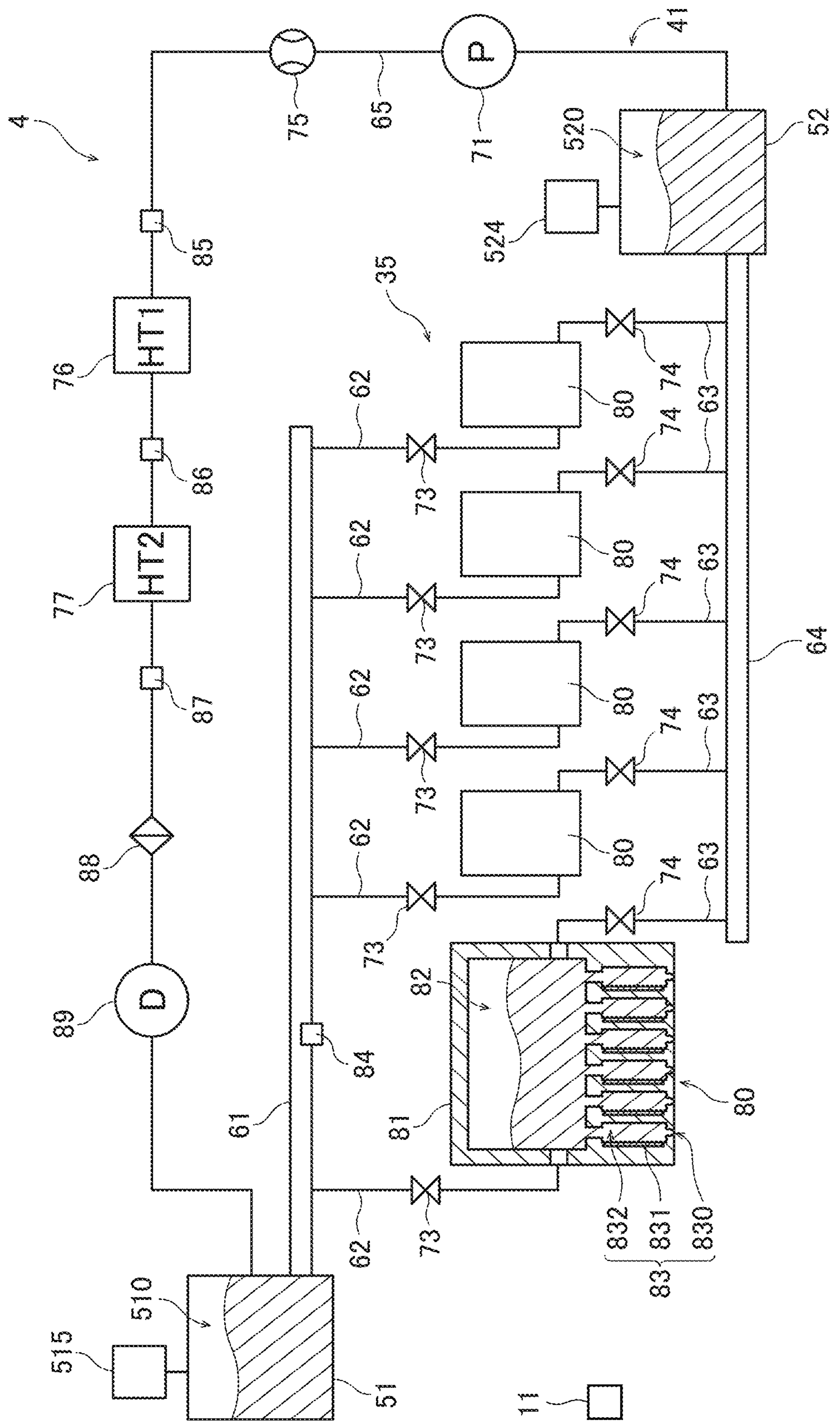
FIG. 2 is a view conceptually showing configurations of an ink supply unit and a discharge head.

FIG. 2 is a view conceptually showing a configuration of one ink supply unit 4 and a configuration of one discharge head 35. In the present embodiment, each of the discharge heads 35 includes a plurality of heads 80 each of which discharges ink. In the present embodiment, each of the discharge heads 35 includes five heads 80. The five heads 80 have substantially the same configuration with each other. Hence, in FIG. 2, only one of the five heads 80 is shown in detail, and the other four heads 80 are shown in a simplified manner. As shown in FIG. 2, each of the five heads 80 includes a casing 81, an internal tank 82, and a plurality of nozzles 83.

The casing 81 forms an outer frame of the head 80. The internal tank 82 is provided in the casing 81, and ink can be temporarily stored therein. The plurality of nozzles 83 are arranged while being equally spaced from each other along the conveying direction and a width direction of the continuous paper 10 in a lower portion of the casing 81. Each of the plurality of nozzles 83 communicates with the internal tank 82. Further, each of the plurality of nozzles 83 includes a plurality of piezoelectric elements 831 serving as pressure generation elements, an ink chamber 832, and a discharge port 830. The ink chamber 832 communicates with the internal tank 82.

During discharge of ink, ink flows down from the internal tank 82 to the ink chamber 832. Then, under the control of the piezoelectric elements 831, ink in the ink chamber 832 is pressurized, and thus is discharged in the form of liquid droplets from the discharge port 830. Alternatively, the nozzle 83 may be a so-called thermal nozzle in which ink in the ink chamber 832 is heated to generate bubbles and thus is pressurized.

Next, the ink supply unit 4 is described. The ink supply unit 4 is a device configured to supply ink to the discharge heads 35 while circulating a part of ink. As described above, the inkjet printing apparatus 1 of the present embodiment includes four ink supply units 4. The four ink supply units 4 have substantially the same configuration with each other, and hence only a configuration of one ink supply unit 4 is described below.

As shown in FIG. 2, each of the ink supply units 4 includes a supply tank 51, a collecting tank 52, a supply-side manifold 61, a plurality of supply-side individual pipes 62, a plurality of collecting-side individual pipes 63, a collecting-side manifold 64, a feedback pipe 65, a circulation pump 71, a plurality of supply-side on-off valves 73, a plurality of head outlet-side on-off valves 74, a flow-rate measurement unit 75, a first heater 76, a second heater 77, a first temperature sensor 84, a second temperature sensor 85, a third temperature sensor 86, a fourth temperature sensor 87, a filter 88, and a deaeration unit 89. In the present embodiment, each of the ink supply units 4 includes five supply-side individual pipes 62, five collecting-side individual pipes 63, five supply-side on-off valves 73, and five head outlet-side on-off valves 74.

The supply tank 51 is a container for temporally storing ink to be supplied to the five heads 80. In the supply tank 51, an internal chamber 510 in which ink can be temporally stored is provided. Meanwhile, in the supply tank 51, a liquid-level sensor for detecting a liquid level of ink stored in the internal chamber 510 of the supply tank 51 may be provided.

The supply-side manifold 61 and the five supply-side individual pipes 62 are pipes connecting the supply tank 51 and the five heads 80 included in one discharge head 35. The supply-side manifold 61 is a wide pipe having an upstream end that is connected so as to communicate with the internal chamber 510 of the supply tank 51. Each of the five supply-side individual pipes 62 is a narrow pipe branching from the supply-side manifold 61. That is, the supply-side manifold 61 has an upstream end communicating with the supply tank 51 and is forked into the five supply-side individual pipes 62. Each of the five supply-side individual pipes 62 has an upstream end communicating with an internal passage of the supply-side manifold 61, and has a downstream end that is connected so as to communicate with the internal tank 82 of one head 80. Thus, the five supply-side individual pipes 62 are connected to the five heads 80, respectively.

Further, in the present embodiment, the supply-side on-off valve 73 is interposed in each of the supply-side individual pipes 62. For the supply-side on-off valve 73, for example, a solenoid valve that is opened and closed under the control of the control unit 9 is used. Alternatively, for the supply-side on-off valve 73, an on-off valve that is manually opened and closed may be used. While the supply-side on-off valve 73 is closed, an internal passage of the supply-side individual pipe 62 is blocked from communicating. That is, while the supply-side on-off valve 73 is closed, ink flow from the supply tank 51 to the head 80 is interrupted. Meanwhile, while the supply-side on-off valve 73 is opened, the internal passage of the supply-side individual pipe 62 is allowed to communicate. Note that the supply-side on-off valve 73 is not necessarily required to be provided. Further, a filter or the like may be further interposed in the supply-side manifold 61 or each of the five supply-side individual pipes 62.

The five collecting-side individual pipes 63 and the collecting-side manifold 64 are pipes connecting the five heads 80 included in one discharge head 35 and the collecting tank 52. Each of the five collecting-side individual pipes 63 is a narrow pipe branching from the collecting-side manifold 64. Each of the five collecting-side individual pipes 63 has an upstream end that is connected so as to communicate with the internal tank 82 of one head 80, and has a downstream end that is connected so as to communicate with an internal passage of the collecting-side manifold 64. Thus, the five collecting-side individual pipes 63 are connected to the five heads 80, respectively. The collecting-side manifold 64 is a wide pipe having a downstream end that is connected so as to communicate with an internal chamber 520 of the collecting tank 52 described later. That is, the collecting-side manifold 64 has a downstream end communicating with the collecting tank 52 and is forked into the five collecting-side individual pipes 63.

Further, in the present embodiment, the head outlet-side on-off valve 74 is interposed in each of the collecting-side individual pipes 63. For the head outlet-side on-off valve 74, for example, a solenoid valve that is opened and closed under the control of the control unit 9 is used. Alternatively, for the head outlet-side on-off valve 74, an on-off valve that is manually opened and closed may be used. While the head outlet-side on-off valve 74 is closed, an internal passage of the collecting-side individual pipe 63 is blocked from communicating. That is, while the head outlet-side on-off valve 74 is closed, ink flow from the head 80 to the collecting tank 52 is interrupted. Meanwhile, while the head outlet-side on-off valve 74 is opened, the internal passage of the collecting-side individual pipe 63 is allowed to communicate. Note that the head outlet-side on-off valve 74 is not necessarily required to be provided. Further, a filter or the like may be further interposed in each of the five collecting-side individual pipes 63 or the collecting-side manifold 64.

The collecting tank 52 is a container for temporally storing ink collected from the five heads 80. In the collecting tank 52, the internal chamber 520 in which ink can be temporally stored is provided. Meanwhile, in the collecting tank 52, a liquid-level sensor for detecting a liquid level of ink stored in the internal chamber 520 of the collecting tank 52 may be provided.

Further, as shown in FIG. 2, the supply tank 51 is connected to a pressurization mechanism 515. The pressurization mechanism 515 pressurizes the inside of the supply tank 51, to regulate a pressure of the internal chamber 510 of the supply tank 51 to a positive pressure. That is, the pressurization mechanism 515 pressurizes the inside of the supply tank 51, to regulate a pressure of the internal chamber 510 of the supply tank 51 to a pressure higher than the atmospheric pressure. The pressurization mechanism 515 includes, for example, a compressor, a pressurization buffer tank, a pressure regulation mechanism (regulator), and the like. Meanwhile, the collecting tank 52 is connected to a decompression mechanism 524. The decompression mechanism 524 decompresses the inside of the collecting tank 52, to regulate a pressure of the internal chamber 520 of the collecting tank 52 to a negative pressure. That is, the decompression mechanism 524 decompresses the inside of the collecting tank 52, to regulate a pressure of the internal chamber 520 of the collecting tank 52 to a pressure lower than the atmospheric pressure. The decompression mechanism 524 includes, for example, a vacuum pump, a decompression buffer tank, a pressure regulation mechanism (regulator), and the like.

The pressurization mechanism 515 and the decompression mechanism 524 are configured such that the operations thereof can be controlled by the control unit 9. When the pressurization mechanism 515 and the decompression mechanism 524 are driven, there is generated a pressure difference between the internal chamber 510 of the supply tank 51 and the internal chamber 520 of the collecting tank 52. As a result, ink stored in the supply tank 51 can be supplied to each of the five heads 80 of the discharge head 35, and further, ink remaining in the each of the five heads 80 can be collected into the collecting tank 52. Note that the ink remaining in each of the five heads 80 is ink being left undischarged in each of the five heads 80.

Note that the pressurization mechanism 515 and the decompression mechanism 524 are not necessarily required to make a pressure of the internal chamber 510 of the supply tank 51 and a pressure of the internal chamber 520 of the collecting tank 52, positive and negative, respectively, as long as those pressures can be adjusted such that the pressure of the internal chamber 510 of the supply tank 51 is higher than the pressure of the internal chamber 520 of the collecting tank 52. For example, the pressurization mechanism 515 may adjust a pressure of the internal chamber 510 of the supply tank 51 to a pressure equal to the atmospheric pressure, and the decompression mechanism 524 may adjust a pressure of the internal chamber 520 of the collecting tank 52 to a negative pressure. That is, the pressurization mechanism 515 may adjust a pressure of the internal chamber 510 of the supply tank 51 to a pressure equal to the atmospheric pressure, and the decompression mechanism 524 may adjust a pressure of the internal chamber 520 of the collecting tank 52 to a pressure lower than the atmospheric pressure.

The feedback pipe 65 is a pipe connecting the internal chamber 520 of the collecting tank 52 and the internal chamber 510 of the supply tank 51 in such a manner as to allow the internal chambers to communicate with each other. Thus, the feedback pipe 65 connects the collecting tank 52 and the supply tank 51. As shown in FIG. 2, an internal passage of the feedback pipe 65 has an upstream end that is connected so as to communicate with the internal chamber 520 of the collecting tank 52. Further, the internal passage of the feedback pipe 65 has a downstream end that is connected so as to communicate with the internal chamber 510 of the supply tank 51.

With the above-described configuration, there is formed an ink circulation path 41 that starts from the supply tank 51, extends through the supply-side manifold 61, the supply-side individual pipes 62, the internal tanks 82 of the heads 80, the collecting-side individual pipes 63, the collecting-side manifold 64, the collecting tank 52, and the feedback pipe 65, and returns back to the supply tank 51. That is, the ink circulation path 41 includes the supply tank 51, the supply-side manifold 61, the five supply-side individual pipes 62, the five heads 80, the five collecting-side individual pipes 63, the collecting-side manifold 64, the collecting tank 52, and the feedback pipe 65. Further, in the feedback pipe 65, the circulation pump 71, the flow-rate measurement unit 75, the first heater 76, the second heater 77, the first temperature sensor 84, the second temperature sensor 85, the third temperature sensor 86, the fourth temperature sensor 87, the filter 88, and the deaeration unit 89 are interposed.

The circulation pump 71 is a device configured to perform a pumping operation of delivering ink from the collecting tank 52 to the supply tank 51 via the feedback pipe 65. The circulation pump 71 generates ink flow from the collecting tank 52 to the supply tank 51 in the internal passage of the feedback pipe 65 in response to an operation signal from the control unit 9. For the circulation pump 71 of the present embodiment, for example, a pump in which foreign matters such as dust are unlikely to be generated during driving, such as a diaphragm pump, is used.

The flow-rate measurement unit 75 is interposed between the circulation pump 71 and the supply tank 51 in the feedback pipe 65. The flow-rate measurement unit 75 measures a flow rate of ink flowing through the internal passage of the feedback pipe 65. That is, the flow-rate measurement unit 75 measures a flow rate of ink flowing through the circulation path 41. Further, the flow-rate measurement unit 75 is electrically connected to the control unit 9. Then, the flow-rate measurement unit 75 outputs data regarding a result of measurement of a flow rate of ink, to the control unit 9.

The first heater 76 is a device configured to heat ink delivered through the internal passage of the feedback pipe 65. The first heater 76 heats ink flowing from the collecting tank 52 to the supply tank 51. The first heater 76 is positioned between the circulation pump 71 and the supply tank 51 in the feedback pipe 65. The first heater 76 includes a heating element formed of a carbon heater or the like and is connected to a power supply via an ON/OFF circuit not shown. Then, the first heater 76 can heat ink by generating heat in an ON state in which power is turned on. Further, the first heater 76 is controlled such that, for example, a temperature of ink flowing out of the first heater 76 is equal to a target temperature higher than the room temperature by switching between an ON state and an OFF state. Hereinafter, the target temperature will be referred to as a "feedback upstream-side target temperature Tr1 (° C.)".

The second heater 77 is a device configured to heat ink delivered through the internal passage of the feedback pipe 65. The second heater 77 is positioned between the first heater 76 and the supply tank 51 in the feedback pipe 65. That is, the second heater 77 is positioned on the downstream side of the first heater 76 with respect to an ink delivery direction. The second heater 77 includes a heating element formed of a carbon heater or the like and is connected to the power supply via the ON/OFF circuit not shown. Then, the second heater 77 can heat ink by generating heat in an ON state in which power is turned on. Further, the second heater 77 is controlled such that, for example, a temperature of ink flowing out of the second heater 77 is equal to a target temperature higher than the feedback upstream-side target temperature Tr1 (° C.) by switching between an ON state and an OFF state. Note that the target temperature higher than the feedback upstream-side target temperature Tr1 (° C.) is a target temperature that is, for example, n1° C. higher than the feedback upstream-side target temperature Tr1 (° C.). Here, n1° C. is a positive value of approximately a few degrees centigrade. Hereinafter, this target temperature will be referred to as a "feedback downstream-side target temperature Tr2 (° C.)". Thus, the second heater 77 has a duty value larger than a duty value of the first heater 76. Note that the "duty value" means a ratio of a time period of an ON state of each of the first and second heaters 76 and 77, to a unit time period.

Meanwhile, the second heater 77 corresponds to a "heater" of the present invention. Further, the feedback downstream-side target temperature Tr2 (° C.) corresponds to a "second target temperature" of the present invention. Note that, in the present invention, the number of heaters interposed between the circulation pump 71 and the supply tank 51 in the feedback pipe 65 may be one or three or larger. That is, any heater that is interposed in the feedback pipe 65 and heats ink flowing from the collecting tank 52 to the supply tank 51 can be used as the "heater" of the present invention.

As shown in FIG. 2, the first temperature sensor 84 is interposed in the supply-side manifold 61. The first temperature sensor 84 corresponds to a "supply-side temperature sensor" of the present invention. The first temperature sensor 84 detects a temperature of ink delivered through the internal passage of the supply-side manifold 61. That is, the first temperature sensor 84 detects a temperature of ink in the supply-side manifold 61. Further, the first temperature sensor 84 is electrically connected to the control unit 9. The first temperature sensor 84 outputs data regarding a result of detection of an ink temperature, to the control unit 9.

The second temperature sensor 85 is interposed on the downstream side of the circulation pump 71 with respect to the ink delivery direction and on the upstream side of the first heater 76 with respect to the ink delivery direction in the feedback pipe 65. The second temperature sensor 85 detects a temperature of ink flowing into the first heater 76. Further, the second temperature sensor 85 is electrically connected to the control unit 9. The second temperature sensor 85 outputs data regarding a result of detection of an ink temperature, to the control unit 9. The control unit 9 can find at what temperature ink has originally flowed into the first heater 76, by referring to data regarding a result of detection by the second temperature sensor 85. This serves as a measure for the control unit 9 to determine whether the first heater 76 and the second heater 77 normally operate, in controlling driving of those heaters as described later. Note that the second temperature sensor 85 is not necessarily required to be provided.

The third temperature sensor 86 is interposed on the downstream side of the first heater 76 with respect to the ink delivery direction and on the upstream side of the second heater 77 with respect to the ink delivery direction in the feedback pipe 65. The third temperature sensor 86 detects a temperature of ink flowing out of the first heater 76. Further, the third temperature sensor 86 is electrically connected to the control unit 9. The third temperature sensor 86 outputs data regarding a result of detection of an ink temperature, to the control unit 9. Note that the third temperature sensor 86 is not necessarily required to be provided.

The fourth temperature sensor 87 is interposed on the downstream side of the second heater 77 with respect to the ink delivery direction and on the upstream side of the supply tank 51 with respect to the ink delivery direction in the feedback pipe 65. The fourth temperature sensor 87 corresponds to a "feedback-side temperature sensor" of the present invention. The fourth temperature sensor 87 detects a temperature of ink flowing out of the second heater 77. That is, the fourth temperature sensor 87 detects a temperature of ink in the feedback pipe 65. Further, the fourth temperature sensor 87 is electrically connected to the control unit 9. The fourth temperature sensor 87 outputs data regarding a result of detection of an ink temperature, to the control unit 9.

The filter 88 is interposed on the downstream side of the second heater 77 with respect to the ink delivery direction and on the upstream side of the supply tank 51 with respect to the ink delivery direction in the feedback pipe 65. The filter 88 filters ink delivered through the internal passage of the feedback pipe 65, to remove foreign matters included in the ink.

The deaeration unit 89 is interposed on the downstream side of the filter 88 with respect to the ink delivery direction and on the upstream side of the supply tank 51 with respect to the ink delivery direction in the feedback pipe 65. The deaeration unit 89 of the present embodiment is a so-called hollow-fiber membrane deaeration module. The deaeration unit 89 removes bubbles in ink delivered through the internal passage of the feedback pipe 65.

The in-housing temperature sensor 11 is placed, for example, near the discharge head 35 in the inkjet printing apparatus 1. For the sake of ease in description, the in-housing temperature sensor 11 is shown also in FIG. 2. The in-housing temperature sensor 11 detects a temperature of a space near the discharge head 35. That is, the in-housing temperature sensor 11 detects a temperature of a space external to the circulation path 41. Further, the in-housing temperature sensor 11 is electrically connected to the control unit 9. The in-housing temperature sensor 11 outputs data regarding a result of detection of a temperature of a space external to the circulation path 41, to the control unit 9. Note that a position where the in-housing temperature sensor 11 is placed is not limited to the above-described position. A position where the in-housing temperature sensor 11 is placed is appropriately adjusted in consideration of a stream of hot air from a dryer (not shown) additionally provided in the inkjet printing apparatus 1, and the like. Meanwhile, the in-housing temperature sensor 11 is not necessarily required to be provided.

Figure 3:
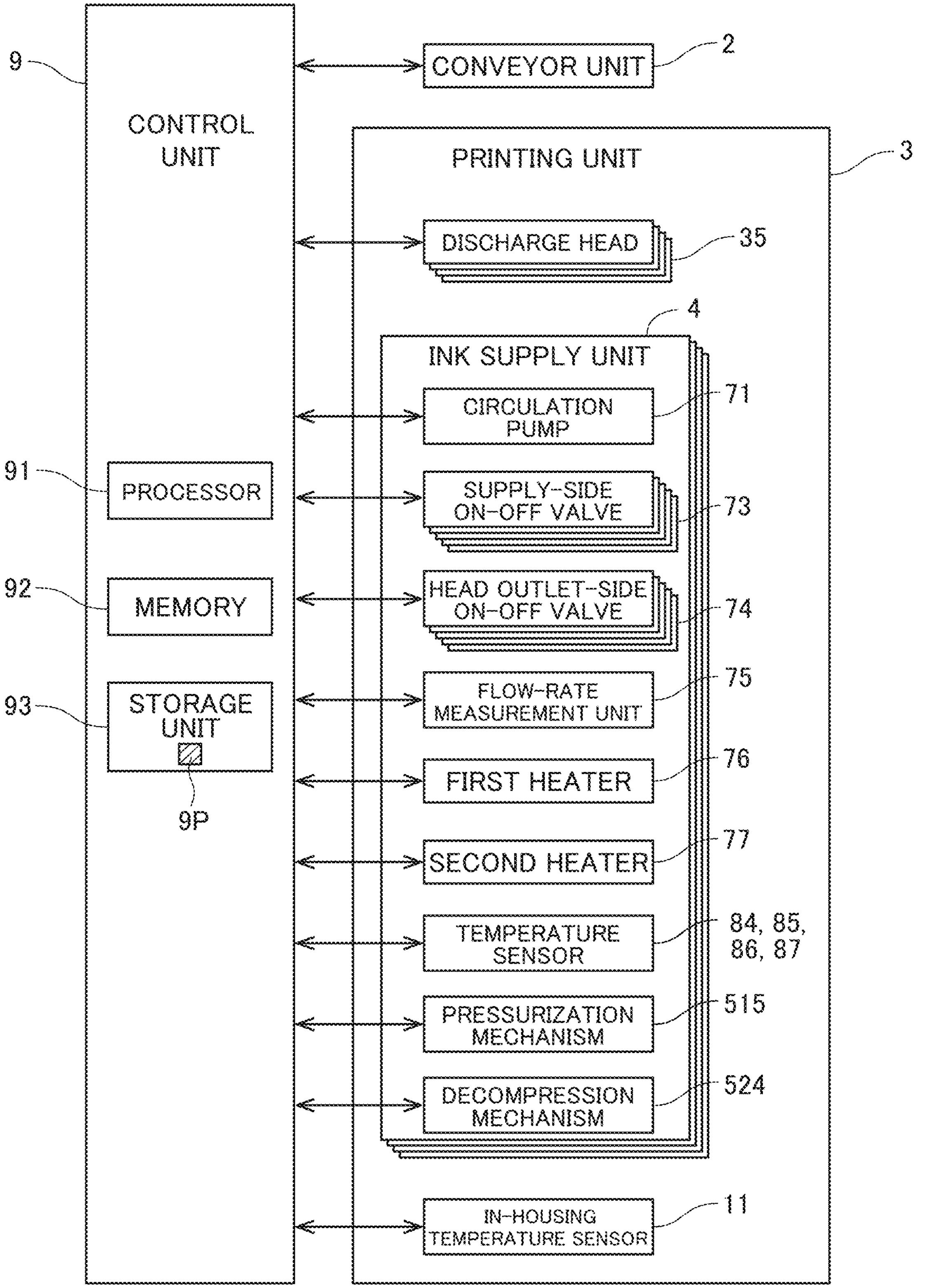
FIG. 3 is a block diagram showing connection between a control unit and each component of the inkjet printing apparatus.

Next, the control unit 9 is described. The control unit 9 is an information processing device configured to control each component of the inkjet printing apparatus 1. FIG. 3 is a block diagram showing connection between the control unit 9 and each component of the inkjet printing apparatus 1. As conceptually shown in FIG. 3, the control unit 9 includes a processor 91 such as a CPU, a memory 92 such as a RAM, and a storage unit 93 such as a hard disk drive. In the storage unit 93, a computer program 9P for performing conveyance of the continuous paper 10, printing on the continuous paper 10, ink circulation, and temperature control of ink, is stored.

Further, as shown in FIG. 3, the control unit 9 is electrically connected to the conveyor unit 2 and the four discharge heads 35 of the printing unit 3, and is further electrically connected to the circulation pump 71, the five supply-side on-off valves 73, the five head outlet-side on-off valves 74, the flow-rate measurement unit 75, the first heater 76, the second heater 77, the first temperature sensor 84, the second temperature sensor 85, the third temperature sensor 86, the fourth temperature sensor 87, the pressurization mechanism 515, and the decompression mechanism 524 of each of the four ink supply units 4 of the printing unit 3, and to the in-housing temperature sensor 11 such that the control unit 9 can conduct communication to/from the above-described components.

That is, the control unit 9 can control each of the conveyor unit 2, the four discharge heads 35 of the printing unit 3, the circulation pump 71, the five supply-side on-off valves 73, the five head outlet-side on-off valves 74, the flow-rate measurement unit 75, the first heater 76, the second heater 77, the first temperature sensor 84, the second temperature sensor 85, the third temperature sensor 86, the fourth temperature sensor 87, the pressurization mechanism 515, and the decompression mechanism 524 of each of the four ink supply units 4 of the printing unit 3, and the in-housing temperature sensor 11. The control unit 9 controls operations of those components in accordance with the computer program 9P.

1-2. Conveyance of Continuous Paper, Printing, Ink Circulation, and Temperature Control of Ink Next, description is given about a procedure for conveyance of the continuous paper 10, printing on the continuous paper 10, ink circulation, and temperature control of ink that are performed in the inkjet printing apparatus 1.

In performing conveyance of the continuous paper 10, printing on the continuous paper 10, and ink circulation, the control unit 9 first causes the conveyor unit 2 to operate, to convey the continuous paper 10 along the predetermined conveying path in the conveying direction extending along the length direction. Further, the control unit 9 controls the plurality of nozzles 83 of each of the four discharge heads 35 such that ink droplets are discharged onto the surface of the continuous paper 10, while conveying the continuous paper 10. Thus, an image is recorded on the surface of the continuous paper 10.

Meanwhile, as advance preparation for conveyance of the continuous paper 10, printing on the continuous paper 10, and ink circulation, a sufficient amount of ink is stored in the internal chamber 510 of the supply tank 51. Further, the control unit 9 opens the five supply-side on-off valves 73 and the five head outlet-side on-off valves 74.

Then, the control unit 9 drives the circulation pump 71, the first heater 76, the second heater 77, the pressurization mechanism 515, and the decompression mechanism 524 of each of the four ink supply units 4. That is, the control unit 9 drives the circulation pump 71 to circulate ink through the ink circulation path 41, while driving the pressurization mechanism 515 and the decompression mechanism 524 to supply ink to the internal tank 82 of each discharge head 35.

Further, the power of the first temperature sensor 84, the second temperature sensor 85, the third temperature sensor 86, the fourth temperature sensor 87, and the in-housing temperature sensor 11 is turned on, and those sensors each start measuring an ink temperature or an inside temperature at each position. Moreover, the power of the flow-rate measurement unit 75 is turned on, and the flow-rate measurement unit 75 starts measuring a flow rate of ink flowing through the circulation path 41.

Here, as a precondition for conveyance of the continuous paper 10 and printing, it is required that a temperature of ink discharged from each of the heads 80 be within a predetermined range. When a temperature of ink is out of the predetermined range, ink cannot be satisfactorily discharged from the nozzles 83, possibly causing clogging of the nozzles 83. Further, in a case in which a temperature of ink is kept excessively high for a certain time period or longer, ink is changed in quality, so that printing quality might be degraded. In this regard, at the time of start-up or the like of the inkjet printing apparatus 1, temperatures of ink present in the circulation path 41 and ink to be added to the internal chamber 510 of the supply tank 51 are significantly low. Then, in a case in which a temperature of ink does not reach a temperature appropriate for discharge, one possible way to deal with this case is, for example, to drive the second heater 77 at a large duty value while referring to a result of detection of a temperature of ink flowing out of the second heater 77 by the fourth temperature sensor 87.

However, even though a temperature of ink flowing out of the second heater 77 is adjusted to within the predetermined range, there is a fear that the temperature of ink might be reduced again due to heat dissipation during passing of the ink through the long circulation path 41 to arrival at each of the head 80. In such a case, there is a fear that the ink temperature cannot be maintained at an appropriate temperature in the heads 80. Meanwhile, another possible way is to set a target temperature of ink flowing out of the second heater 77 at a higher temperature so that the ink temperature in the head 80 is within the predetermined range and to drive the second heater 77 at a larger duty value. However, in this case, exact control is difficult. Specifically, in this case, there is a fear that the temperature of ink flowing out of the second heater 77 becomes excessively high eventually, possibly resulting in a change in quality of the ink. Further, in an effort to exactly control driving of the second heater 77 in accordance with a result of detection of an ink temperature by a temperature sensor placed near the heads 80 from the starting time at which the ink temperature does not reach a temperature appropriate for discharge, it takes much time to complete adjustment of the ink temperature, possibly reducing the workability.

Figure 4:
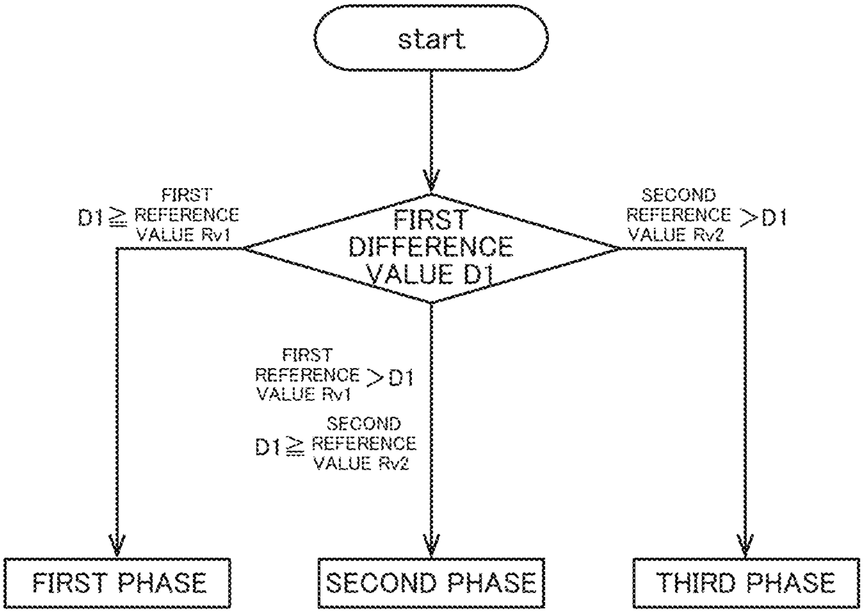
FIG. 4 is a flowchart for determining whether a first difference value D1 applies to a first phase, a second phase, or a third phase.

In view of this, in the present embodiment, driving of the second heater 77 is controlled in a plurality of separate phases in accordance with a difference between a target temperature of ink in the supply-side manifold 61 near each head 80 and a result of detection of an actual temperature of ink in the supply-side manifold 61. Hereinafter, the target temperature of ink in the supply-side manifold 61 will be referred to as a "supply-side target temperature Ts1 (° C.)". More specifically, the control unit 9 determines to which of the following first to third phases a difference value obtained by subtracting a result of detection of a temperature of ink in the supply-side manifold 61 by the first temperature sensor 84 from the supply-side target temperature Ts1 (° C.) of ink in the supply-side manifold 61, applies. Hereinafter, this difference value will be referred to as a "first difference value D1". FIG. 4 is a flowchart for determining to which of the first to third phases the first difference value D1 applies. Note that the supply-side target temperature Ts1 (° C.) corresponds to a "first target temperature" of the present invention.

As shown in FIG. 4, the first phase corresponds to a case in which the first difference value D1 is equal to or larger than a first reference value Rv1 (n0° C.). Here, n0° C. is, for example, a value satisfying "n0° C.>n1° C.>0° C.". The second phase corresponds to a case in which the first difference value D1 is smaller than the first reference value Rv1 and is equal to or larger than a second reference value Rv2 (n2° C.) smaller than the first reference value Rv1. Here, n2° C. is, for example, a value satisfying "n1° C.>n2° C.>0° C.". The third phase corresponds to a case in which the first difference value D1 is smaller than the second reference value Rv2. Then, when the control unit 9 determines that the first difference value D1 applies to the first phase, the second phase, or the third phase, the control unit 9 controls driving of the second heater 77 in the following manner. Note that the phases for controlling driving of the second heater 77 are not limited to the above-described three types of phases. The phases for controlling driving of the second heater 77 may include two types of phases or four or more types of phases.

1-2-1. Case of Applying to First Phase

In the case of applying to the first phase, it can be considered that there is a sufficient gap between the supply-side target temperature Ts1 (° C.) of ink in the supply-side manifold 61 and an actual temperature of ink in the supply-side manifold 61. That is, it can be considered that an actual temperature of ink in the supply-side manifold 61 is sufficiently low. Then, the control unit 9 drives the second heater 77 while referring to only a result of detection of a temperature of ink flowing out of the second heater 77 by the fourth temperature sensor 87.

More specifically, the control unit 9 controls the second heater 77 such that an ink temperature detected by the fourth temperature sensor 87 is equal to the above-described feedback downstream-side target temperature Tr2 (° C.) set in advance. For the control method, PID control, PI control, and the like can be used. That is, the control unit 9 generates a control value CV1 for controlling the second heater 77 and inputs the control value CV1 to the second heater 77. Here, the control value CV1 is, for example, a value indicating a value of power imparted to the heating element in the second heater 77. Further, the control value CV1 is a value obtained by multiplication of a difference value obtained by subtracting an ink temperature detected by the fourth temperature sensor 87 from the feedback downstream-side target temperature Tr2 (° C.), by a first coefficient k1 (positive value). Hereinafter, this difference value will be referred to as a "second difference value D2". Meanwhile, the first coefficient k1 is set by, for example, a preliminary experiment performed beforehand.

When it is determined that the first difference value D1 applies to the first phase, the control unit 9 controls driving of the second heater 77 in accordance with a value obtained by multiplication of the second difference value D2 by the first coefficient k1, the second difference value D2 being obtained by subtracting a result of detection of a temperature of ink in the feedback pipe 65 by the fourth temperature sensor 87 from the feedback downstream-side target temperature Tr2 (° C.). In other words, the control unit 9 controls driving of the second heater 77 in accordance with a value obtained by multiplication of the second difference value D2 by the first coefficient k1, the second difference value D2 being obtained by subtracting a result of detection of a temperature of ink in the feedback pipe 65 by the feedback-side temperature sensor from the second target temperature of ink in the feedback pipe 65. Thus, in the first phase, in which a temperature of ink in the supply-side manifold 61 is low, the second heater 77 is driven with high intensity, which enables reduction of time for start-up from low temperatures.

Meanwhile, when it is determined that the first difference value D1 applies to the first phase, the control unit 9 may further control driving of the first heater 76 in accordance with a value obtained by multiplication of a difference value by the first coefficient k1 or another coefficient, the difference value being obtained by subtracting a result of detection of a temperature of ink in the feedback pipe 65 by the third temperature sensor 86 from the above-described feedback upstream-side target temperature Tr1 (° C.). In a case in which an actual temperature of ink in the supply-side manifold 61 is higher than the supply-side target temperature Ts1 (° C.) of ink in the supply-side manifold 61 by the first reference value Rv1 (a positive value of approximately a few degrees centigrade) or larger, though such a case is supposed to hardly occur, the first heater 76 and the second heater 77 are stopped operating immediately.

1-2-2. Case of Applying to Second Phase

Next, in the case of applying to the second phase, it can be considered that an actual temperature of ink in the supply-side manifold 61 is close to the supply-side target temperature Ts1 (° C.) of ink in the supply-side manifold 61 to some extent. Note that this case includes not only a case in which an actual temperature of ink in the supply-side manifold 61 is lower than the supply-side target temperature Ts1 (° C.), but also a case in which an actual temperature of ink in the supply-side manifold 61 is slightly higher than the supply-side target temperature Ts1 (° C.) for some reason. In the case of applying to the second phase, the control unit 9 controls driving of the second heater 77 while referring to a result of detection of a temperature of ink flowing out of the second heater 77 by the fourth temperature sensor 87 and further considering heat dissipation during passing of ink through the circulation path 41 to arrival at each head 80.

More specifically, heat dissipation of ink is greatly affected by a temperature of a space near the circulation path 41. Hence, the control unit 9 generates a heat-dissipation correction value CV2 in consideration of a temperature of a space near the discharge head 35, detected by the above-described in-housing temperature sensor 11 placed near the discharge head 35, for example. Note that the heat-dissipation correction value CV2 is, for example, a value calculated by multiplication of a temperature of a space near the discharge head 35, detected by the in-housing temperature sensor 11, by a second coefficient k2 (negative value). The second coefficient k2 is set by, for example, a preliminary experiment performed beforehand. Then, the control unit 9 inputs a value obtained by addition of the above-described control value CV1 and the heat-dissipation correction value CV2, to the second heater 77, and performs PID control, PI control, or the like over the second heater 77. For example, in a case in which a temperature of a space near the discharge head 35 is significantly high, it is considered that an amount of heat dissipation of ink is small. Thus, by adding up a value obtained by multiplication of the temperature by the second coefficient k2 (negative value) and the above-described control value CV1, it is possible to moderate driving intensity for the second heater 77 to some extent.

When it is determined that the first difference value D1 applies to the second phase, the control unit 9 controls driving of the second heater 77 in accordance with the control value CV1 calculated by multiplication of the above-described second difference value D2 by the first coefficient k1, and the heat-dissipation correction value CV2 calculated by multiplication of a result of detection of a temperature of a space external to the circulation path 41 by the in-housing temperature sensor 11, by the second coefficient k2. Thus, in the second phase, a temperature of a space external to the circulation path 41 in the inkjet printing apparatus 1 is referred to, whereby also heat dissipation of ink can be taken into account. This enables more exact driving of the second heater 77 than in the first phase. Alternatively, the heat-dissipation correction value CV2 may be derived from a temperature of a space near the discharge head 35, detected by the in-housing temperature sensor 11, by making reference to a table prepared in advance. Further alternatively, the heat-dissipation correction value CV2 may be calculated by multiplication of a difference value by a fifth coefficient k5 (positive value), the difference value being obtained by subtracting a temperature of a space near the discharge head 35, detected by the in-housing temperature sensor 11, from a result of detection of a temperature of ink flowing near the discharge head 35 in the circulation path 41.

Further, when it is determined that the first difference value D1 applies to the second phase, the control unit 9 may correct the control value CV1 using a heat-dissipation correction value CV3 calculated by another different method. For example, the control unit 9 may calculate the heat-dissipation correction value CV3 by multiplying a difference value by a fourth coefficient k4 (positive value), the difference value being obtained by subtracting a result of detection of a temperature of ink in the supply-side manifold 61 by the first temperature sensor 84 from a result of detection of a temperature of ink in the feedback pipe 65 by the fourth temperature sensor 87. Hereinafter, this difference value will be referred to as a "third difference value D3". In other words, the control unit 9 may calculate the heat-dissipation correction value CV3 by multiplying the third difference value D3 by the fourth coefficient k4 (positive value), the third difference value D3 being obtained by subtracting a result of detection of a temperature of ink in the supply-side manifold 61 by the supply-side temperature sensor from a result of detection of a temperature of ink in the feedback pipe 65 by the feedback-side temperature sensor. The fourth coefficient k4 is set by, for example, a preliminary experiment performed beforehand. Then, the control unit 9 inputs a value obtained by addition of the above-described control value CV1 and the heat-dissipation correction value CV3, to the second heater 77, and performs PID control, PI control, or the like over the second heater 77.

Consequently, an actual amount of heat dissipation of ink from a position where the fourth temperature sensor 87 is placed in the circulation path 41 to a position where the first temperature sensor 84 is placed in the supply-side manifold 61 can be taken into account. This enables more exact driving of the second heater 77 than in the first phase.

Moreover, when it is determined that the first difference value D1 applies to the second phase, the control unit 9 may further correct the value obtained by addition of the above-described control value CV1 and the above-described heat-dissipation correction value CV2 or the heat-dissipation correction value CV3, using a result of measurement of a flow rate of ink flowing through the circulation path 41 by the flow-rate measurement unit 75. Then, the control unit 9 may input the corrected value to the second heater 77, and perform PID control, PI control, or the like over the second heater 77. Thus, for example, in a case in which a result of measurement of a flow rate of ink flowing through the circulation path 41 by the flow-rate measurement unit 75 is significantly high, by further increasing a value to be input to the second heater 77, it is possible to drive the second heater 77 with high intensity. This enables an increase of an ink temperature in shorter time.

That is, when it is determined that the first difference value D1 applies to the second phase, the control unit 9 may control driving of the second heater 77 in accordance with the control value CV1 calculated by multiplication of the second difference value D2 by the first coefficient k1 and a value obtained by correction of the heat-dissipation correction value CV2 or the heat-dissipation correction value CV3 using a result of measurement of a flow rate of ink by the flow-rate measurement unit 75. Thus, in the second phase, a flow rate of ink is also referred to, which enables much more exact driving of the second heater 77.

Furthermore, when it is determined that the first difference value D1 applies to the second phase, the control unit 9 may correct the control value CV1 using a heat-dissipation correction value that is calculated by another different method. Meanwhile, when it is determined that the first difference value D1 applies to the second phase, the control unit 9 may further control driving of the first heater 76 in accordance with the control value CV1 and a heat-dissipation correction value that is calculated by any of the above-described methods.

1-2-3. Case of Applying to Third Phase

Next, in the case of applying to the third phase, it can be considered that an actual temperature of ink in the supply-side manifold 61 is sufficiently close to the supply-side target temperature Ts1 (° C.) of ink in the supply-side manifold 61. Note that this case includes not only a case in which an actual temperature of ink in the supply-side manifold 61 is slightly lower than the supply-side target temperature Ts1 (° C.), but also a case in which an actual temperature of ink in the supply-side manifold 61 is slightly higher than the supply-side target temperature Ts1 (° C.) due to a subtle change in a driving amount of the second heater 77, ink flow, and the like. In the case of applying to the third phase, the control unit 9 controls driving of the second heater 77 while referring to a result of detection of a temperature of ink flowing out of the second heater 77 by the fourth temperature sensor 87, considering heat dissipation of ink, and further referring to a result of detection of an actual temperature of ink in the supply-side manifold 61 by the first temperature sensor 84.

More specifically, the control unit 9 calculates a final correction value CV4 by multiplying the first difference value D1 by a third coefficient k3 (positive value), the first difference value D1 being obtained by subtracting a result of detection of a temperature of ink in the supply-side manifold 61 by the first temperature sensor 84 from the supply-side target temperature Ts1 (° C.) of ink in the supply-side manifold 61. Note that the third coefficient k3 is set by, for example, a preliminary experiment performed beforehand. Then, the control unit 9 inputs a value obtained by addition of the above-described control value CV1, the above-described heat-dissipation correction value CV2 or the heat-dissipation correction value CV3, and the final correction value CV4, to the second heater 77, and performs PID control, PI control, or the like over the second heater 77.

That is, when it is determined that the first difference value D1 applies to the third phase, the control unit 9 controls driving of the second heater 77 in accordance with the control value CV1 calculated by multiplication of the second difference value D2 by the first coefficient k1, the heat-dissipation correction value CV2 or the heat-dissipation correction value CV3, and the final correction value CV4 calculated by multiplication of the first difference value D1 by the third coefficient k3. In the third phase, an actual temperature of ink in the supply-side manifold 61 is close to the supply-side target temperature Ts1 (° C.) (first target temperature). Thus, by more exactly driving the second heater 77 while referring to an actual temperature of ink in the supply-side manifold 61, it is possible to suppress overheating of ink.

Alternatively, in the third phase, the second heater 77 may be driven without consideration of the heat-dissipation correction value CV2 or the heat-dissipation correction value CV3. That is, when it is determined that the first difference value D1 applies to the third phase, the control unit 9 may control driving of the second heater 77 in accordance with the control value CV1 calculated by multiplication of the second difference value D2 by the first coefficient k1 and the final correction value CV4 calculated by multiplication of the first difference value D1 by the third coefficient k3. However, also in the third phase, it is possible to drive the second heater 77 more exactly by taking into account the heat-dissipation correction value CV2 and the heat-dissipation correction value CV3 as described above.

Meanwhile, it is not necessarily required to determine whether the first difference value D1 applies to the first phase, the second phase, or the third phase and to calculate the final correction value CV4, in accordance with the above-described first difference value D1 at a certain point in time. Alternatively, in one modification, the first difference value D1 and the final correction value CV4 may be calculated at regular intervals. More specifically, a temperature of ink in the supply-side manifold 61 may be detected at regular intervals using the first temperature sensor 84. Then, the control unit 9 may calculate the first difference value D1 at regular intervals by subtracting an actual temperature of ink in the supply-side manifold 61, detected by the first temperature sensor 84, from the supply-side target temperature Ts1 (° C.). Thus, the control unit 9 may determine whether the first difference value D1 applies to the first phase, the second phase, or the third phase, at regular intervals, on the basis of each result of calculation of the first difference value D1.

When it is determined that the first difference value D1 applies to the third phase, further, a temperature of ink flowing out of the second heater 77 may be detected at regular intervals using the fourth temperature sensor 87. Then, the control unit 9 may calculate the second difference value D2 at regular intervals by subtracting an actual temperature of ink in the feedback pipe 65, detected by the fourth temperature sensor 87, from the feedback downstream-side target temperature Tr2 (° C.). Further, the control unit 9 may input a value obtained by addition of the control value CV1 calculated by multiplication of the second difference value D2 by the above-described first coefficient k1 and the final correction value CV4 calculated by multiplication of the first difference value D1 by the above-described third coefficient value k3, to the second heater 77, at regular intervals, and perform PID control, PI control, or the like over the second heater 77.

In this regard, the control unit 9 may add up, not a newly-calculated value of the control values CV1 having been calculated at regular intervals and a newly-calculated value of the final correction values CV4 having been calculated at regular intervals, but a newly-calculated value of the control values CV1 having been calculated at regular intervals and the final correction values CV4 having been calculated at regular intervals, cumulatively. That is, the control unit 9 may input a value obtained by addition of a newly-calculated value of the control values CV1 having been calculated at regular intervals and all of the final correction values CV4 having ever been calculated at regular intervals, to the second heater 77, and drive the second heater 77. Thus, even in a case in which an outlier is output from the fourth temperature sensor 87 for some reason at a certain point in time, it is possible to prevent a value input to the second heater 77 from being extremely large or small. As a result of this, the second heater 77 can be more stably driven in the third phase in which an actual temperature of ink in the supply-side manifold 61 is sufficiently close to the supply-side target temperature Ts1 (° C.). This enables more stable adjustment of an ink temperature.

That is, in this modification, the control unit 9 may calculate the first difference value D1 at regular intervals by subtracting a result of detection of a temperature of ink in the supply-side manifold 61, detected at regular intervals by the first temperature sensor 84 (supply-side temperature sensor), from the supply-side target temperature Ts1 (° C.) (first target temperature) of ink in the supply-side manifold 61. Then, the control unit 9 may determine whether the first difference value D1 calculated at regular intervals applies to the first phase in which the first difference value D1 is equal to or larger than the first reference value Rv1, or the third phase in which the first difference value D1 is smaller than the second reference value Rv2 smaller than the first reference value Rv1. When it is determined that the first difference value D1 applies to the third phase, the control unit 9 may control driving of the second heater 77 in accordance with a value obtained by multiplication of the second difference value D2 by the first coefficient k1 and a value obtained by addition in which values each obtained by multiplication of the first difference value D1 by the third coefficient k3 are cumulatively added up at regular intervals.

2. Second Preferred Embodiment

Next, the inkjet printing apparatus 1 according to a second preferred embodiment of the present invention is described. Note that the inkjet printing apparatus 1 according to the present embodiment is different from the inkjet printing apparatus 1 according to the first preferred embodiment only in details of a structure of the ink supply unit 4. Hence, only differences are described below.

Figure 5:
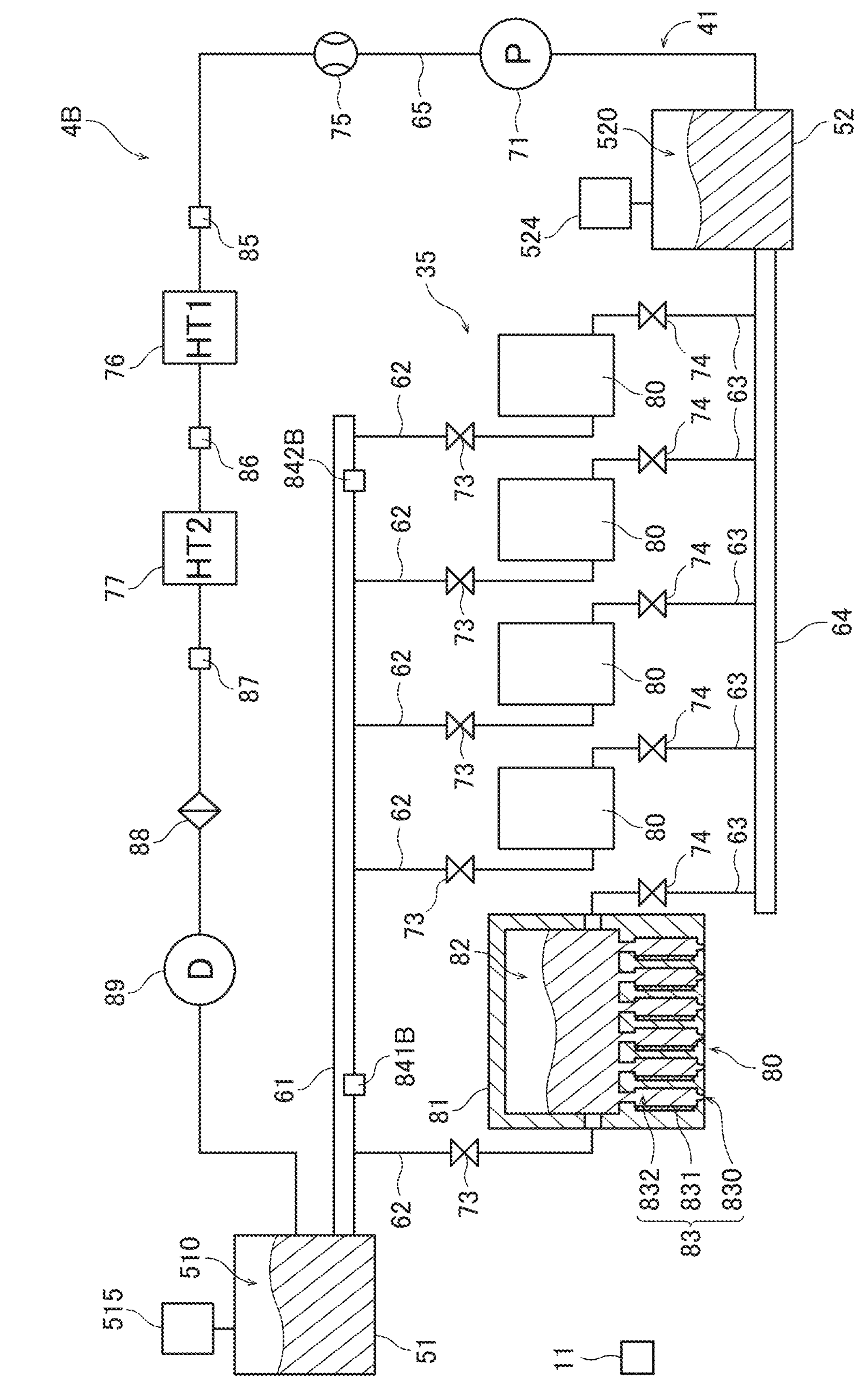
FIG. 5 is a view conceptually showing configurations of an ink supply unit and a discharge head according to a second preferred embodiment.

FIG. 5 is a view conceptually showing a configuration of one ink supply unit 4B and a configuration of one discharge head 35 according to the present embodiment. As shown in FIG. 5, in the supply-side manifold 61 of the ink supply unit 4B of the present embodiment, a plurality of first temperature sensors 841B and 842B are interposed. In the supply-side manifold 61 of the ink supply unit 4B of the present embodiment, two first temperature sensors 841B and 842B are interposed. Each of the first temperature sensors 841B and 842B corresponds to the "supply-side temperature sensor" of the present invention. Each of the first temperature sensors 841B and 842B detects a temperature of ink delivered through the internal passage of the supply-side manifold 61. That is, each of the first temperature sensors 841B and 842B detects a temperature of ink in the supply-side manifold 61. Further, each of the first temperature sensors 841B and 842B is electrically connected to the control unit 9. Each of the first temperature sensors 841B and 842B outputs data regarding a result of detection of an ink temperature, to the control unit. 9.

In the present embodiment, the control unit 9 sets a value as the first difference value D1 in the first phase and the third phase described above, the set value being obtained by subtracting an average value of respective results of detection of a temperature of ink in the supply-side manifold 61, being detected by the first temperature sensors 841B and 842B, from the supply-side target temperature Ts1 (° C.) (first target temperature) of ink in the supply-side manifold 61. Thus, even in a case in which an ink temperature varies with position and is non-uniform in the supply-side manifold 61, the second heater 77 can be stably driven in the first phase and the third phase.

Note that it is preferred that the plurality of first temperature sensors be evenly placed in the supply-side manifold 61. For example, in a case in which the two first temperature sensors 841B and 842B are provided, it is preferred that the first temperature sensors 841B and 842B be evenly placed at a position near an upstream end and a position near a downstream end, respectively, in the supply-side manifold 61. By doing so, it is possible to more stably drive the second heater 77 even in a case in which an ink temperature varies with position and is non-uniform in the supply-side manifold 61.

3. Modifications

Hereinabove, the preferred embodiments of the present invention have been described, but the present invention is not limited to the above-described preferred embodiments.

In the above-described preferred embodiments, each of the first coefficient k1, the third coefficient k3, and the fourth coefficient k4 is a positive value, and the second coefficient k2 is a negative value. However, the sign (positive/negative) of each of the first to fourth coefficients k1 to k4 is not limited to that. Further, the first to fourth coefficients k1 to k4 may be zero.

Further, in the above-described preferred embodiments, the supply-side manifold 61 has an upstream end connected directly to the internal chamber 510 of the supply tank 51. However, the supply-side manifold 61 and the supply tank 51 are not necessarily required to be connected directly to each other as long as ink can flow therebetween. For example, another connecting pipe may be interposed between the supply-side manifold 61 and the supply tank 51.

Moreover, in the above-described preferred embodiments, the collecting-side manifold 64 has a downstream end connected directly to the internal chamber 520 of the collecting tank 52. However, the collecting-side manifold 64 and the collecting tank 52 are not necessarily required to be connected directly to each other as long as ink can flow therebetween. For example, another connecting pipe may be interposed between the collecting-side manifold 64 and the collecting tank 52.

Furthermore, the respective elements described in the above-described preferred embodiments and modifications may be appropriately combined unless contradiction occurs.

While the invention has been shown and described in detail, the foregoing description is in all aspects illustrative and not restrictive. It is therefore understood that numerous modifications and variations can be devised without departing from the scope of the invention.

What is claimed is:

1. An inkjet printing apparatus that discharges ink onto a printing medium to perform printing, comprising:

an ink circulation path including a plurality of heads configured to discharge ink, a supply tank in which ink supplied to the plurality of heads is stored, a plurality of supply-side individual pipes connected to the plurality of heads, respectively, a supply-side manifold that has an upstream end communicating with the supply tank and is forked into the plurality of supply-side individual pipes, a collecting tank in which ink collected from the plurality of heads is stored, and a feedback pipe connecting the collecting tank and the supply tank;

a heater that is interposed in the feedback pipe and is configured to heat ink flowing from the collecting tank to the supply tank;

a feedback-side temperature sensor that is interposed between the heater and the supply tank in the feedback pipe and is configured to detect a temperature of ink in the feedback pipe;

a supply-side temperature sensor that is interposed in the supply-side manifold and is configured to detect a temperature of ink in the supply-side manifold; and a control unit electrically connected to each of the heater, the feedback-side temperature sensor, and the supply-side temperature sensor, wherein the control unit determines whether a first difference value obtained by subtracting a result of detection of the temperature of the ink in the supply-side manifold by the supply-side temperature sensor, from a first target temperature of the ink in the supply-side manifold, applies to a first phase in which the first difference value is equal to or larger than a first reference value, or a third phase in which the first difference value is smaller than a second reference value smaller than the first reference value, and when the temperature is determined that the first difference value applies to the first phase, the control unit controls driving of the heater in accordance with a value obtained by multiplication of a second difference value by a first coefficient, the second difference value being obtained by subtracting a result of detection of the temperature of the ink in the feedback pipe by the feedback-side temperature sensor from a second target temperature of the ink in the feedback pipe, and when the temperature is determined that the first difference value applies to the third phase, the control unit controls driving of the heater in accordance with the value obtained by multiplication of the second difference value by the first coefficient and a value obtained by multiplication of the first difference value by a third coefficient.

2. The inkjet printing apparatus according to claim 1, further comprising an in-housing temperature sensor configured to detect a temperature of a space external to the circulation path, wherein the control unit determines whether the first difference value applies to a second phase in which the first difference value is smaller than the first reference value and is equal to or larger than the second reference value, and when the temperature is determined that the first difference value applies to the second phase, the control unit controls driving of the heater in accordance with the value obtained by multiplication of the second difference value by the first coefficient and a heat-dissipation correction value obtained by multiplication of a result of detection of the temperature of the space external to the circulation path, being detected by the in-housing temperature sensor, by a second coefficient.

3. The inkjet printing apparatus according to claim 1, wherein the control unit determines whether the first difference value applies to a second phase in which the first difference value is smaller than the first reference value and is equal to or larger than the second reference value, and when the temperature is determined that the first difference value applies to the second phase, the control unit controls driving of the heater in accordance with the value obtained by multiplication of the second difference value by the first coefficient, and a heat-dissipation correction value obtained by multiplication of a third difference value by a fourth coefficient, the third difference value being obtained by subtracting the result of detection of the temperature of the ink in the supply-side manifold, being detected by the supply-side temperature sensor, from the result of detection of the temperature of the ink in the feedback pipe, being detected by the feedback-side temperature sensor.

4. The inkjet printing apparatus according to claim 2, wherein, when the temperature is determined that the first difference value applies to the third phase, the control unit controls driving of the heater in accordance with the value obtained by multiplication of the second difference value by the first coefficient, the heat-dissipation correction value, and the value obtained by multiplication of the first difference value by the third coefficient.

5. The inkjet printing apparatus according to claim 1, wherein the control unit determines whether the first difference value calculated at regular intervals applies to the first phase in which the first difference value is equal to or larger than the first reference value, or the third phase in which the first difference value is smaller than the second reference value smaller than the first reference value, the first difference value being obtained by subtracting the result of detection of the temperature of the ink in the supply-side manifold, being detected at the regular intervals by the supply-side temperature sensor, from the first target temperature of the ink in the supply-side manifold, and when the temperature is determined that the first difference value applies to the third phase, the control unit controls driving of the heater in accordance with the value obtained by multiplication of the second difference value by the first coefficient, and a value obtained by addition in which values each obtained by multiplication of the first difference value by the third coefficient are cumulatively added up at the regular intervals.

6. The inkjet printing apparatus according to claim 1, further comprising a plurality of the supply-side temperature sensors that are interposed in the supply-side manifold and are configured to detect the temperature of the ink in the supply-side manifold, wherein the control unit sets a value obtained by subtracting an average value of respective results of detection of the temperature of the ink in the supply-side manifold by the plurality of supply-side temperature sensors from the first target temperature of the ink in the supply-side manifold, as the first difference value.

7. The inkjet printing apparatus according to claim 2, further comprising a flow-rate measurement unit configured to measure a flow rate of ink flowing through the circulation path, wherein the control unit is further electrically connected to the flow-rate measurement unit, and when the temperature is determined that the first difference value applies to the second phase, the control unit controls driving of the heater in accordance with a value obtained by correction in which the value obtained by multiplication of the second difference value by the first coefficient, and the heat-dissipation correction value, are corrected using a result of measurement of the flow rate of the ink by the flow-rate measurement unit.

8. The inkjet printing apparatus according to claim 1, wherein the first coefficient is a positive value.

9. The inkjet printing apparatus according to claim 2, wherein the first coefficient is a positive value, and the second coefficient is a negative value.

10. The inkjet printing apparatus according to claim 1, wherein the first coefficient is a positive value, and the third coefficient is a positive value.

11. The inkjet printing apparatus according to claim 3, wherein the first coefficient is a positive value, and the fourth coefficient is a positive value.

* * * * *